(12) United States Patent
Dwivedi et al.

(10) Patent No.: US 11,014,765 B1
(45) Date of Patent: May 25, 2021

(54) SYSTEM AND METHOD FOR COLLIMATING ITEMS

(71) Applicant: Amazon Technologies, Inc., Seattle, WA (US)

(72) Inventors: Rajeev Dwivedi, Collin, TX (US); Mohit Malik, Seattle, WA (US); Vivek Narayanan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/369,493

(22) Filed: Mar. 29, 2019

(51) Int. Cl.
*B65G 47/57* (2006.01)
*B65G 15/22* (2006.01)

(52) U.S. Cl.
CPC ........... *B65G 47/57* (2013.01); *B65G 15/22* (2013.01); *B65G 2201/02* (2013.01)

(58) Field of Classification Search
None
See application file for complete search history.

(56) References Cited

U.S. PATENT DOCUMENTS

| | | | |
|---|---|---|---|
| 2,973,109 A | 2/1961 | Gable | |
| 3,605,983 A | 9/1971 | Oldershaw | |
| 3,771,641 A * | 11/1973 | Jonsson | B65G 47/1492 198/396 |
| 4,232,778 A | 11/1980 | Rysti | |
| 4,660,712 A | 4/1987 | Braidotti et al. | |
| 5,069,440 A * | 12/1991 | Lazzarotti | B65G 47/2445 198/415 |
| 5,363,950 A | 11/1994 | Lacuna et al. | |
| 5,423,431 A | 6/1995 | Westin | |
| 5,632,381 A * | 5/1997 | Thust | B07C 5/34 209/44.1 |
| 5,641,052 A | 6/1997 | Lazzarotti et al. | |
| 5,950,800 A * | 9/1999 | Terrell | B65G 47/1492 198/448 |
| 6,464,065 B2 * | 10/2002 | Herubel | B65G 47/31 198/347.4 |
| 6,491,154 B2 * | 12/2002 | Ydoate | B65G 47/31 198/444 |
| 7,938,252 B2 * | 5/2011 | Schroader | B65G 21/209 198/535 |
| 9,199,281 B2 | 12/2015 | Fourney et al. | |
| 9,533,836 B2 * | 1/2017 | Cristoforetti | B65G 47/682 |
| 10,246,267 B2 | 4/2019 | Ragan | |
| 2002/0060129 A1 | 5/2002 | Cooper et al. | |
| 2002/0079194 A1 | 6/2002 | Ydoate et al. | |
| 2004/0255701 A1 | 12/2004 | Strohmeyer et al. | |
| 2007/0068772 A1 * | 3/2007 | Bahr | B65G 47/2445 198/461.2 |
| 2010/0025191 A1 | 2/2010 | Kokko | |
| 2017/0312789 A1 * | 11/2017 | Schroader | B65G 43/10 |

* cited by examiner

*Primary Examiner* — William R Harp
(74) *Attorney, Agent, or Firm* — BakerHostetler

(57) ABSTRACT

A conveyor system for processing items, such as manufacturers' products or boxes, from a three-dimensional arrangement to a two-dimensional arrangement includes inclined and declined conveyors. The inclined conveyor may include vacuum through perforations in the belt. A collimating conveyor includes parallel belts that operate at different speeds to space the items longitudinally apart and then align the items against sidewalls.

17 Claims, 5 Drawing Sheets

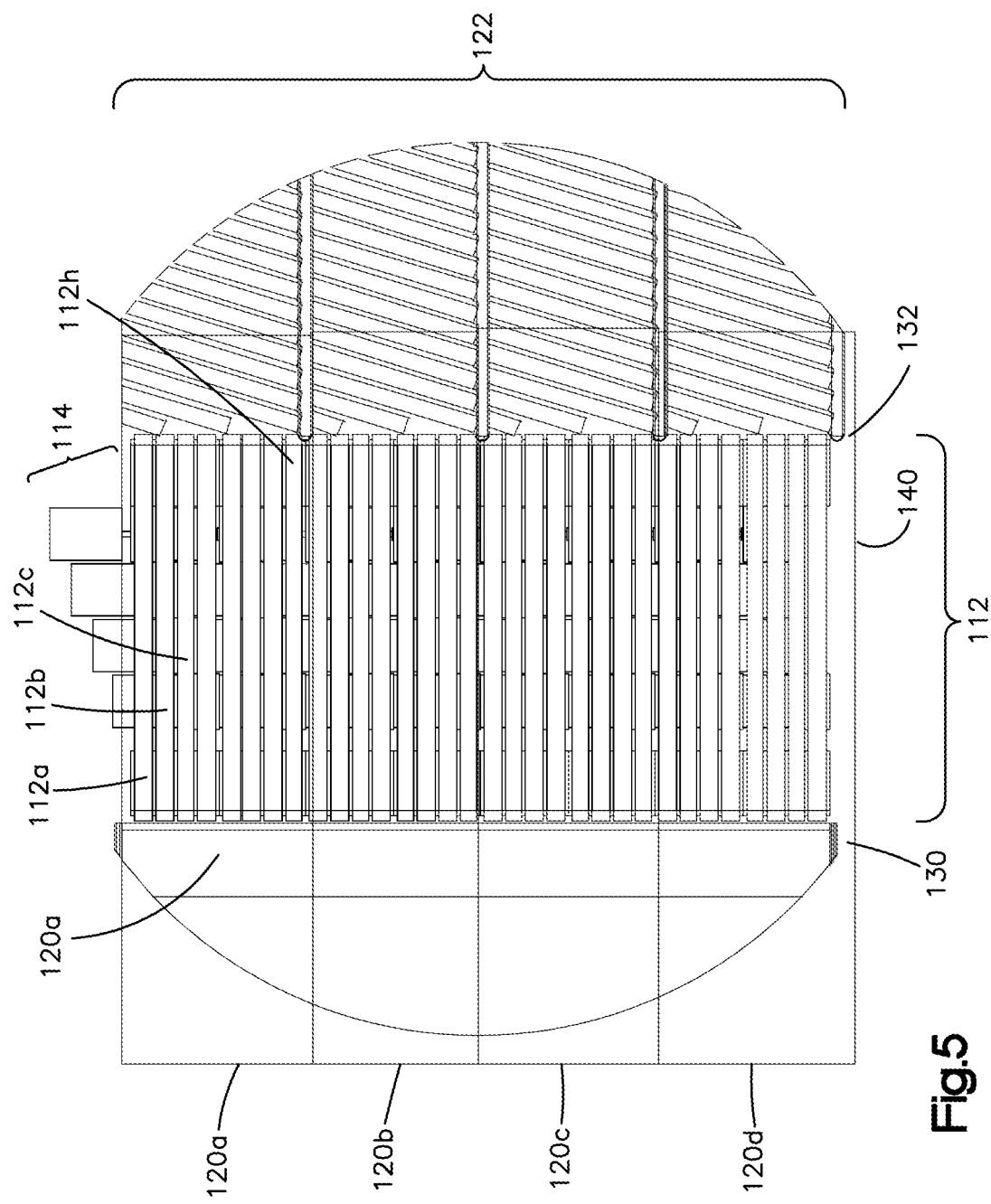

SYSTEM AND METHOD FOR COLLIMATING ITEMS

BACKGROUND

This invention is related to conveying and handling items, and more particularly to systems and methods for separating items during conveying.

A great number of items are moved in modern commerce. For example, in a modern fulfillment center, a vast number of different products are moved on conveyors. Further, a vast number of paperboard boxes containing items are moved on conveyors in facilities such as sort centers and like facilities. Several types of conveyors, such as belt conveyors and roller conveyors, are used in modern commerce.

In many circumstances, items can be discharged onto a conveyor such that the items are jumbled together or even piled up in a few layers. As used herein, the term "item" refers to at least one of products, mailers, and/or boxes, and/or any other discrete objects typically transported on conveyors.

BRIEF DESCRIPTION OF THE DRAWINGS

FIG. 5 is an enlarged top view of the collimating conveyor of FIG. 2.

DETAILED DESCRIPTION OF ILLUSTRATIVE EMBODIMENTS

Figure 1:
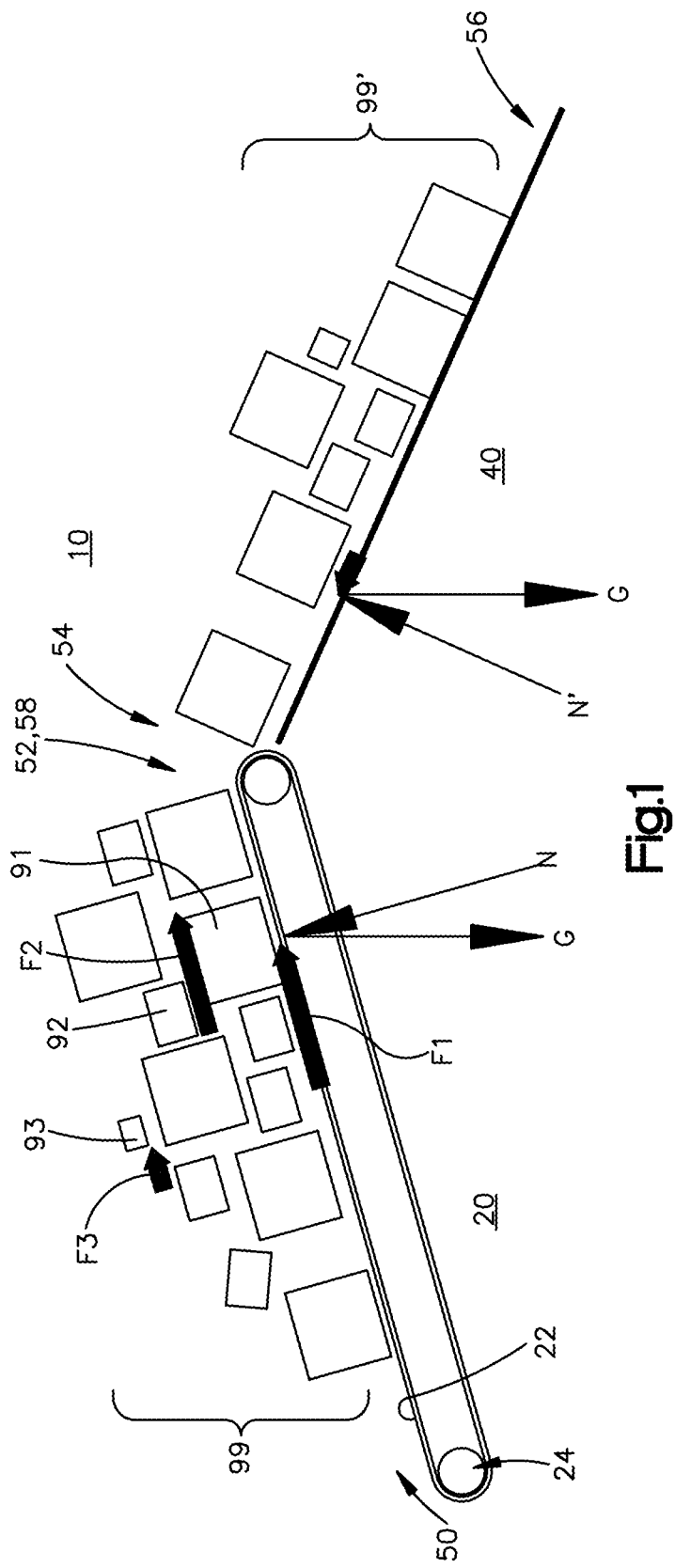
FIG. 1 is a schematic illustration of forces applied to a three-dimensional arrangement of items via an inclined conveyor and declined conveyor.

Items loaded on belt are often piled or randomly stacked on a conveyor. In many circumstances, it is desirable to convey items one-at-a-time. In some environments, items are introduced stacked or in an amorphous jumble. The inventors have designed a system that introduces a mechanical discontinuity into a continuous stream of items such that a sudden change in the direction of gravitation forces act on the stream of items, to interrupt the continuous stream, as schematically illustrated in FIG. 1. Thus, the smooth layers shift, as the laminar configuration of the items reorient or slide or move relative to one another as the items move past the crest formed between the two conveyors.

Without intending to be limited to the following explanation, items 99 arranged in a three-dimensional arrangement (such as layers) have different adhering forces acting at the lower and upper interface of each item or layer. Because the friction force between items is based on the coefficient of friction and normal force in direction N (FIG. 1), the frictional forces between items tends to increase from lower to higher levels. As illustrated, force F1 at the interface between the conveyor and the items is larger than force F2 at the interface between the lower most item 91 and the second layer item 92 on item 91. And force F2 is larger than force F3 at the interface with second layer item 92 and the third layer item 93 on item 92. The forces F1, F2, and F3 represent the frictional forces between items the items or between the lowermost item and the belt. Further, the conveyor surface that may be chosen for a high coefficient of friction when used with the items. A vacuum force may be used to enhance the gripping of items on the belt surface.

As the packages move on an inclined surface and are exposed to the mechanical discontinuity, the force difference across the two interfaces causes the packages to slip. The slipping results in reducing the number of layers.

Upon or after exiting the conveyor having the mechanical discontinuity, the items move to a collimating conveyor system that spaces the items longitudinally apart and then aligns them into one or more columns. The system may include mechanical separators 222 adapted for further separating the collimated items, as illustrated schematically in FIG. 4.

A conveyor system 10 receives packages 99 at an inlet 50 of an inclined conveyor 20, which discharges onto a declined conveyor 40 to form crest between the conveyors 20 and 40.

Figure 2:
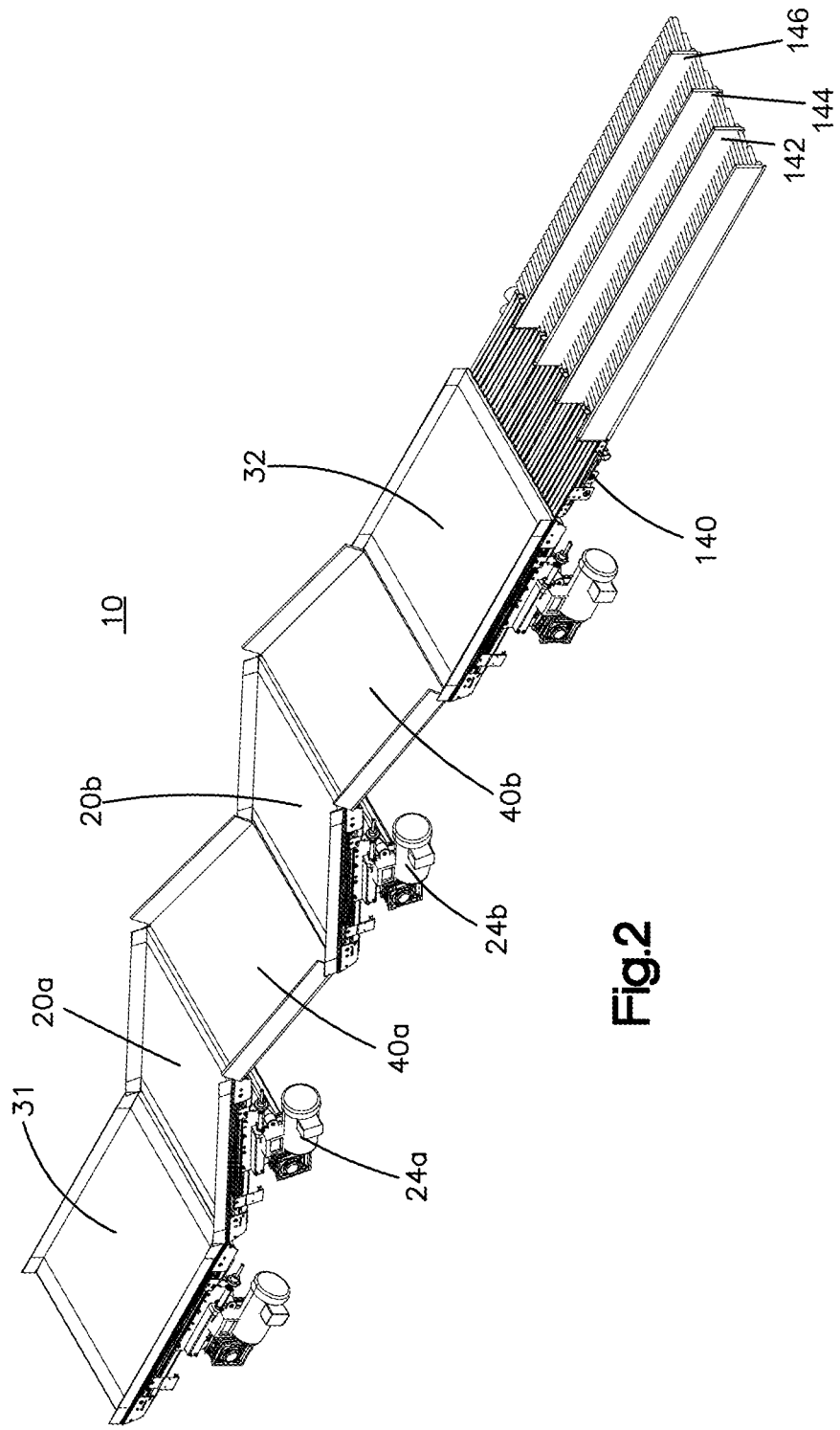
FIG. 2 is a perspective view of a conveyor system for reducing the three-dimensional arrangement into a two-dimensional arrangement and collimating the two-dimensional arrangement.
Figure 3:
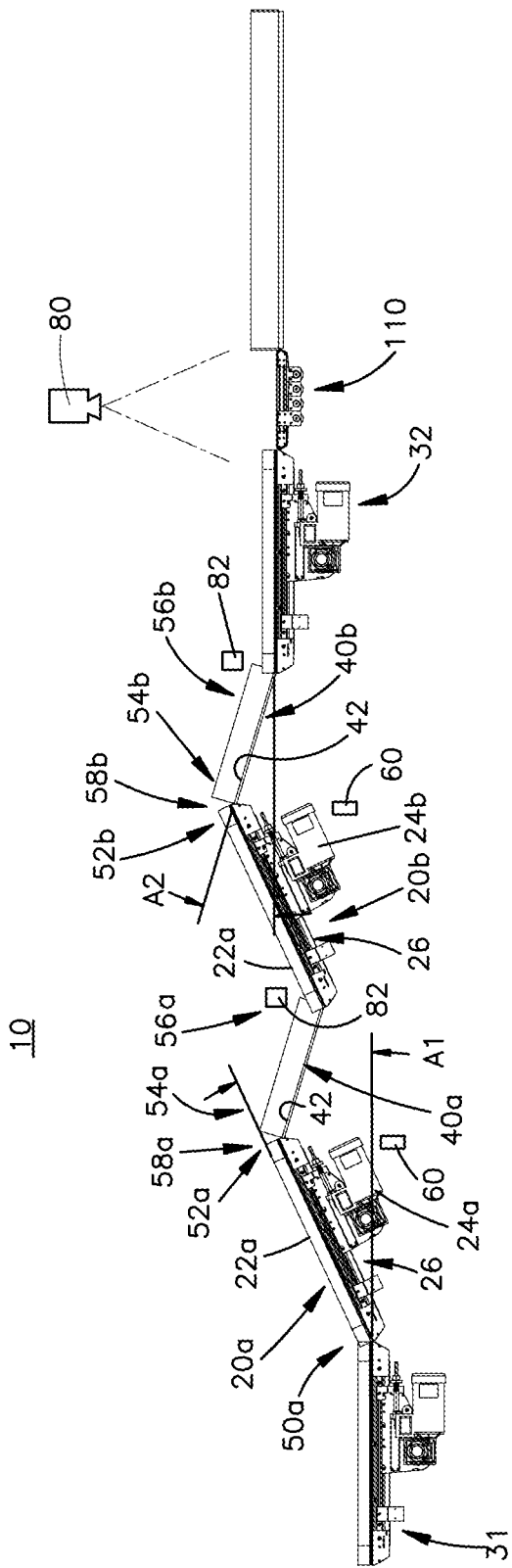
FIG. 3 is a side view of the conveyor of FIG. 2.
Figure 4:
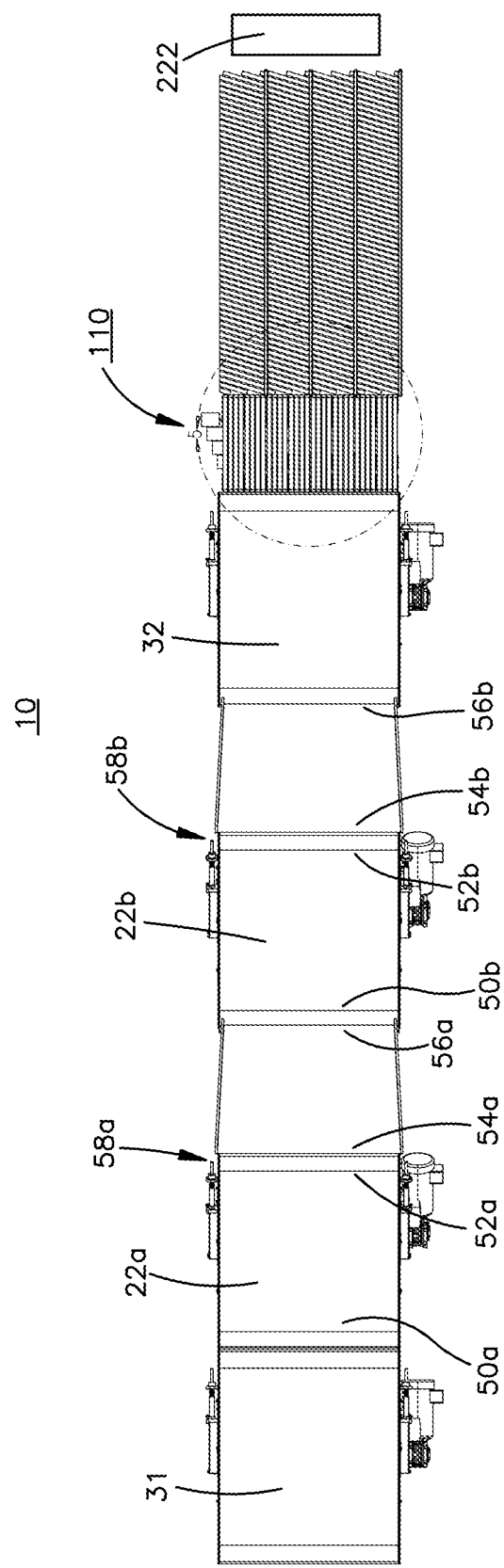
FIG. 4 is a top view of the conveyor of FIG. 2.

As illustrated in FIGS. 2 through 4, conveyor system 10 includes a pair of inclined conveyors 20 and declined conveyors 40. Reference letters 'a' and 'b' are appended to the reference numbers of conveyor system 10 when referring to particular structures. Reference numbers used herein without an appended letter refer to the structure generally. An inlet conveyor 31 can feed items to conveyor system 10 and an outlet conveyor 32 can transport items from conveyor system 10. Conveyors 31 and 32 may be horizontal belt conveyors or conveyors of other types.

Inclined conveyor 20 preferably is a belt-type conveyor, which has a belt surface 22 that may be chosen for its anti-slip (high coefficient of friction) surface. Any material is contemplated, and other types of conveyors may be employed. A motor and drive 24 powers belt 22. In the embodiment of the figures, the motor and drive 24 is variable speed. The motor itself may of any type, such as without limitation a variable speed AC or DC motor, or a fixed speed motor with a variable speed coupling such as an eddy coupling, or a variable speed gearbox, belt drive, or the like. Accordingly, belt 20 is configured to convey items uphill from inlet 50 to inclined conveyor outlet 52. The material of belt 20 may be a conventional rubber or the like, or other material chosen to diminish slipping of items on belt surface 22.

Declined conveyor 40 preferably is a chute or slide 42 such that items discharging at inclined conveyor 54 slide down 42, as the change in direction of the forces at crest 58 between conveyors 20 and 40 facilitates reduction of the number of layers of the items. In this regard, slide 42 is a fixed (that is not moving rolling, vibrating, and the like) surface on which the items can slide by gravity. The present invention is not limited to a slide, as other conveyors (such as without limitation powered conveyors) may be employed.

Conveyor system 10 can include more than one inclined and declined conveyor, and in many circumstances more than one pair of inclined and declined conveyors are preferred. As illustrated in the figures, items picked up by a first inclined conveyor 20a at inlet 50a are conveyed uphill and then discharged onto declined at discharge 52a onto slide 40a at crest 58a. The items slide down from inlet 54a on slide 40a and exit at discharge 56a to be picked up at inclined conveyor 20b at inlet 50b. Items are conveyed up inclined conveyor 20b and then discharged at discharge 52b onto declined conveyor 40b at crest 58b. The items slide down inclined conveyor 20b from inlet 54b to discharge 56b. More inclined and declined conveyors may be used.

Optionally, inclined conveyors 20a and 20b may include a perforated belt 22a, 22b to which vacuum is provided typically to grooves in the belt. Vacuum pulled through the belt perforations enhance the gripping of belt surface 22a on items. Vacuum is preferred when the items conveyed are various products, such term is used to refer to a wide variety of products (that is, packaged products sold via e-commerce in the manufacturer's packaging) processed in an order fulfillment center. Vacuum may also be useful to enhance gripping of paperboard boxed, mailers, and the like.

For example, some products among the various products may be difficult to convey uphill. For example, cylindrical items may roll at the inlets 50 of inclined conveyor 20. Vacuum pressure applied through the belt 22 enhance the ability of the conveyor 10 to process difficult items, such as cylindrical or rounded products.

As illustrated in the figures, inclined conveyors 20a and 20b may be inclined at an angle indicated by A1 and declined conveyors 40a and 40b may be declined by an angle A2. The angles A1 and A2 may be chosen according to the particular items intended to be conveyed and processed from a three-dimensional arrangement to a two-dimensional arrangement, belt conveyor material, whether vacuum is present and if so the vacuum pressure and size and layout of the perforations, belt speed, and like parameters as a person familiar with conveyors will understand. Conveyor 20a may be inclined at different angle A1 than that of conveyor 20b. Conveyor 40a may be inclined at a different angle A2 than that of conveyor 40b.

A sensor 82, such as a photoelectric sensor, vision system, or other means to sense the presence of items, may be positioned on conveyor 40 or other locations. The signal from sensor 82 may be used to vary the speed of drive 24. For example, in circumstances in which items are longitudinally spaced apart when passing sensor 82, the speed of the conveyor 40 may be increased to decrease the spacing between items and increase throughput. Other changes to the speed of conveyors may be made depending upon the signal from sensor 82, the rate of packages at the inlet to conveyor 40, the degree of stacking of the packages at the inlet of conveyor 40, the number of conveyors in the system, and like parameters.

The conveyors may also have a lift 60, illustrated schematically in FIG. 2, to vary angle A1 of conveyor 20 and/or angle A2 of conveyor 40, depending on the effectiveness of the reduction in item layers, particular item choice, and like parameters. Lift 60 may be any conventional type, such as (without limitation) a scissor lift, linear actuator, and the like. Thus, sensors 82 and a vision system 80 located at an outlet of outlet conveyor 32 may control the speed of belts 22a and 22b via drives 24a and 24b, and may control angles A1 and/or A2 via lifts 60.

Items at outlet 56b of conveyor system 10 are in an amorphous two-dimensional arrangement and are fed into collimating conveyor 110. Conveyor 110 includes plural, parallel, elongate belts 112, which are indicated on FIG. 5 particularly as items 112a, 112b, 112c, . . . , 112n, where the total number of belts are represented by 'n'.

Each belt 112 can have its own unique speed. For example, in one embodiment, an outboard-most belt 112a can have a fastest speed, with decreasing speed extending across the belt, such that the speed of belt 112a is greater than the speed of adjacent belt 112b, and belt speed of belt 112b is greater than adjacent belt 112c, etc.

The differential speed of the conveyors 112a et seq. longitudinally space items that arrive at the inlet of belt 112 at the same time. For example, if three items arrive at the inlet to belts 112 simultaneously, the item encountering the fastest speed belt will arrive at an aligner 150 first, followed by the item that encounters the next fastest belt, and then followed by the item that encounters the slowest of the three belts.

Belts 112 can also be configured into groups or zones 120, such each belt within a zone operate at the same speed. For example, referring to FIG. 5, eight belts 112a through 112h are configured as a belt zone 120a. All belts in zone 120a operate at the same speed, which is greater than the belts of next zone 120b.

An aligner 122 includes walls 142, 144, and 146 (FIG. 2) that are configured to receive collimated items from belt 120. The conveyor portion 150 of the aligner 122 under walls 140 through 146 may be an angled such the items are conveyed to or toward the corresponding wall 140 through 146.

A vision system 80, illustrated in FIG. 3, can control the speed of belts 112 according to apply desired shear forces to the items, depending on the belt materials, mass and shape of the items, whether the items are various products or boxes, and like parameters. Vision system 80 may be of any type, such as 1D, 2D, 3d, line scan, area scan, or other. Other sensors or controls may be employed.

Some, any, or all of the methods and operations described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

The various examples further can be implemented using one or more user computers, computing devices or processing devices. Such a system can include a number of workstations running any of a variety of commercially-available operating systems and other known applications for purposes such as development and database management. These devices also can include other electronic devices, such as dummy terminals, thin-clients, and other devices capable of communicating via a network.

Operating environments can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

The conveyor technology disclosed herein may be employed with machine learning algorithms or artificial intelligence that enhances the control of the fingers and associated structure and function. In this regard, a control system may interpolate from existing information about and experiences with successful and unsuccessful prior sequences of seeing, engaging, and lifting an object according to established principles for computer learning. Further, the inventors contemplate a control system may extrapolate from the information and experiences to establish new sequences and functions for the conveyors.

In view of the above controls description, the present invention is not intended to be limited to any particular type of hardware or software or any particular control means, but rather is intended to be able to be employed using any suitable controller.

The present invention has been described by employing examples of structure and function of the tool and related structures. The present invention is not intended to be limited to the particular structure or function of the tool or related structures unless expressly stated in the claims. Rather, the invention encompasses the structure(s) and function(s) defined in the claims and understood by persons familiar with container handling to flow naturally from the present disclosure. Further, advantages of the structure and function have been described for context of the invention only. It is not intended that the present invention be limited to any advantage unless expressly stated in the claims.

What is claimed is:

1. A conveyor system for receiving a three-dimensional arrangement of item and collimating the items comprising:
a first conveyor adapted for receiving items in a three-dimensional arrangement, the first conveyor being inclined;
a second conveyor adapted for receiving the items from the first conveyor, the second conveyor being declined;
whereby a change in direction as the items move from the inclined first conveyor to the declined second conveyor separates items to diminish layers of items and plural conveyor segments, the conveyor segments are:
oriented mutually parallel; and
adapted to be operated at speed independently from other conveyor segments;
whereby the conveyor system is adapted to group an amorphous two-dimensional stream of items into columns.

2. The conveyor system of claim 1 further comprising an aligner wall adapted for receiving items from the conveyor segments in an amorphous two-dimensional stream and arranging the items into columns.

3. The conveyor system of claim 2 wherein each one of the conveyor segments includes at least one elongate belt.

4. The conveyor system of claim 3 wherein each conveyor segment is variable speed, such that speeds of the conveyor segments are controllable to group the items into columns.

5. The conveyor system of claim 3 further comprising mechanical separators adapted for further separating the collimated items.

6. The conveyor system of claim 3 further comprising a vision system adapted for detecting items such that the speed of the conveyor segments is controlled in part by inputs from the vision system.

7. The conveyor system of claim 2 wherein each conveyor segment is a single elongate belt.

8. The conveyor system of claim 2 wherein each conveyor segment is a group of parallel, elongate belts that are operated by a common drive such that each belts of the group operates at the same speed as other belts in the group.

9. The conveyor system of claim 2 wherein the conveyor includes longitudinal walls to receive collimated items.

10. The system of claim 1 further comprising aligner walls adapted for receiving items from the conveyor segments in an amorphous two-dimensional stream and arranging the items into columns, and wherein the conveyor segments are oriented side-by-side.

11. The system of claim 10 further comprising a vision system adapted for detecting items such that the speed of the conveyor segments is controlled in part by inputs from the vision system.

12. A method for receiving a three-dimensional arrangement of item and collimating the items comprising the steps of:
conveying items in a three-dimensional arrangement uphill on an inclined first conveyor; and
conveying items from the inclined first conveyor on a declined second conveyor, such that a change in direction as the items move from the inclined first conveyor to the declined second conveyor separates items to diminish layers of items; and
receiving items onto a conveyor segment including plural, elongate belt conveyors;
operating a first one of the belt conveyors at a faster speed than an adjacent second belt conveyor; and operating a third one of the belt conveyors at a speed faster than the adjacent second belt conveyor, thereby moving the items away from one another to group an amorphous two-dimensional stream of items into columns.

13. The method of claim 12 wherein the operating steps include adjusting speed of each one of the belt conveyors.

14. The method of claim 13 further comprising controlling the speed of the belt conveyors based on information from a vision system viewing items on the belt conveyors.

15. The method of claim 12 wherein the first belt conveyor is a group of parallel first belt conveyors, the second belt conveyor is a group of parallel second belt conveyors, and the third belt conveyor is a group of parallel third belt conveyors, the group of first belt conveyors operating at a speed faster than a speed of the group of second belt conveyors, the group of third belt conveyors operating at a speed faster than the group of second belt conveyors.

16. The method of claim 12 wherein the step of moving the items away from one another includes the step of aligning the items against aligner walls.

17. The method of claim 16 further comprising the steps of detecting items with a vision system and controlling the speed of the conveyor segments based at least in part by inputs from the vision system.

\* \* \* \* \*